United States Patent [19]
Lammers et al.

[11] Patent Number: 5,620,281
[45] Date of Patent: Apr. 15, 1997

[54] MACHINE AND METHOD FOR LAYING FILM ON FACE OF LANDFILL

[75] Inventors: Arville J. Lammers; Rodrigo A. Garcia, both of Conroe, Tex.; Joseph G. Gho, Vancouver, Canada

[73] Assignee: EPI Environmental Products Inc., Conroe, Tex.

[21] Appl. No.: 603,153

[22] Filed: Feb. 16, 1996

Related U.S. Application Data

[63] Continuation of Ser. No. 164,375, Dec. 9, 1993, abandoned, which is a continuation-in-part of Ser. No. 104,195, Aug. 10, 1993, Pat. No. 5,416,133.

[51] Int. Cl.$^6$ ....................................... F02B 3/12
[52] U.S. Cl. ............................... 405/129; 405/128
[58] Field of Search .................... 405/36, 128, 129, 405/264, 270

[56] References Cited

U.S. PATENT DOCUMENTS

| | | | |
|---|---|---|---|
| 4,239,824 | 12/1980 | Kasten | 47/9 |
| 4,250,661 | 2/1981 | Kodera et al. | 428/520 |
| 4,337,181 | 6/1982 | Otey et al. | 523/128 |
| 4,786,208 | 11/1988 | Raviv | 405/270 X |
| 4,909,667 | 3/1990 | DeMello | 405/128 |
| 5,070,641 | 12/1991 | Brockington | 47/54 |
| 5,096,941 | 3/1992 | Harnden | 523/126 |
| 5,191,734 | 3/1993 | Weber et al. | 47/9 |
| 5,262,233 | 11/1993 | Sudo et al. | 428/516 |
| 5,304,014 | 4/1994 | Slutz | 405/129 |
| 5,403,126 | 4/1995 | Carriker | 405/270 |
| 5,536,116 | 7/1996 | Lammers et al. | 405/129 |

FOREIGN PATENT DOCUMENTS 0216412   4/1987   European Pat. Off. ............... 523/126

*Primary Examiner*—George A. Suchfield
*Attorney, Agent, or Firm*—Mary J. Gaskin

[57] ABSTRACT

The present invention is directed to a machine which is attached to the compactor to lay film over the face of a landfill. More specifically, the present invention is directed to a machine and the method for laying a polyolefin film over the face of a landfill and distributing available solids such as dirt, clay, gravel or other solid material inside the edges of the film to hold the film against the face of the landfill.

5 Claims, 5 Drawing Sheets

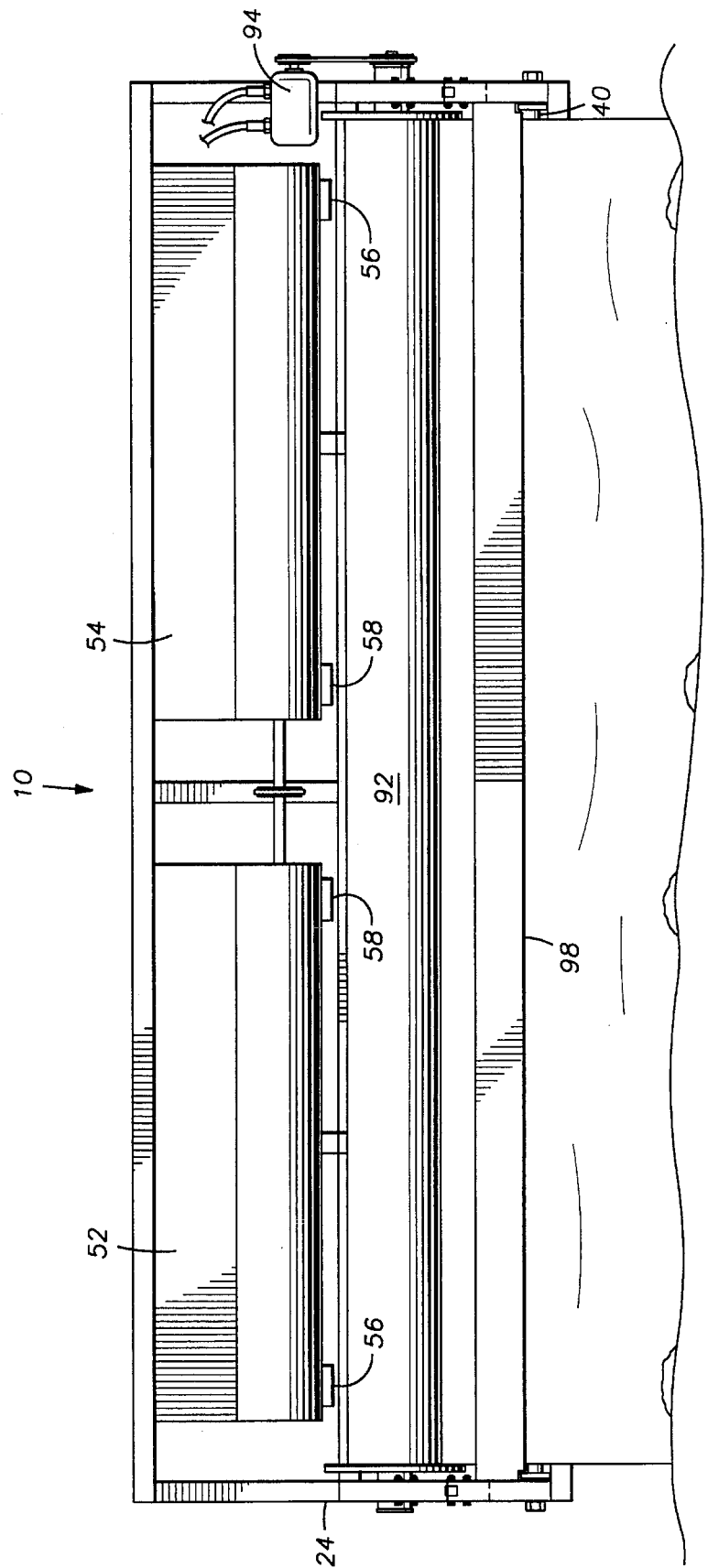

MACHINE AND METHOD FOR LAYING FILM ON FACE OF LANDFILL

CROSS-REFERENCE TO RELATED APPLICATION

This application is a continuation of application(s) Ser. No. 08/164,375 filed on Dec. 9, 1993 now abandoned which is a continuation-in-part application of U. S. patent application Ser. No. 08/104,195 filed Aug. 10, 1993, now U.S. Pat. No. 5,416,133, entitled "CHEMICALLY DEGRADABLE POLYOLEFIN FILM".

FIELD OF THE INVENTION

The present invention is directed to a machine and method for laying a sheet of polyolefin film over the face of a landfill. More specifically, the open face of compacted trash and garbage in landfills is covered by a sheet of polyolefin film held against the face with available dirt, gravel, solids or mixtures thereof.

BACKGROUND OF THE INVENTION

Landfills have become highly regulated. Environmental requirements have established such practices as lining the bottom the landfill. Polyolefin film may be used as a liner of the bottom of landfill pits; however, the lining is done once and the purpose of such a liner is to make the pit impermeable to liquids and solids. Thus, the polyolefin films used are much thicker than those used in the present invention as a cover; further, the widths of film for a liner are heat sealed to make a continuous lining with no fluid opening between widths of the film.

All landfills have a compactor as an operating piece of equipment. Different sized pieces of equipment are used as compactors but all have the common characteristic that the compactor includes a tractor and a blade which pushes the trash and garbage into a desired place. The pushing by the blade and the tractor running over the deposited trash and garbage compacts the deposited materials in the landfill.

Landfills are also required to have the daily fill of trash and garbage covered each night or when the landfill is not in operation. It is understood that the open face of a landfill is the surface of compacted trash and garbage, mostly enclosed in plastic bags, but is also tree pieces, cans, small appliances, wood, shingles, building materials of all kinds, dirt, sludges, and every other material permitted in a landfill. The fill is compacted by the compactor, using an area, trench or ramp method, into an open face which is inclined at an angle of from 5° to 20°. The conventional daily cover for landfills is soil. A six inch cover of soil is required by EPA regulation. Attempts have been made to cover landfills with special materials such as tarps and with special equipment.

According to the present invention, the open face of a landfill is covered very easily every night after completing operation of the landfill with the films of the present invention. The films of the present invention are only 1 to 20 mils thick and prevent the trash from blowing or escaping the landfill. Further, the films of the present invention keep the birds and rodents from entering and scavenging the trash and spreading the trash or disease vectors contained therein to adjacent areas. The film covering also traps the smell of the landfill. The preferred film is a polyolefin film which is degradable.

Polyolefin film has been used as a cover for agricultural purposes. The agricultural film has been laid on the planting surface to enhance and hasten the germination and growth of the plants. In this application, the agricultural film has been held in place by plowing earth onto the edge of the film. This cannot be done in a landfill since earth is not present on the open face of a landfill. Also to cover the face of the landfill, the widths of film must be overlapped.

SUMMARY OF THE INVENTION

The present invention is directed to a machine which is attached to the compactor to lay film over the face of a landfill. More specifically, the present invention is directed to a machine and the method for laying a polyolefin film over the face of a landfill and distributing available solids such as dirt, clay, gravel or other solid material inside the edges of the film to hold the film against the face of the landfill.

BRIEF DESCRIPTION OF THE DRAWINGS

FIG. 5 is a front view of a machine of the present invention which has a roller adapted for rolling up the film which has been laid on the face of a landfill for reuse.

DESCRIPTION OF THE PREFERRED EMBODIMENTS

Figure 1:
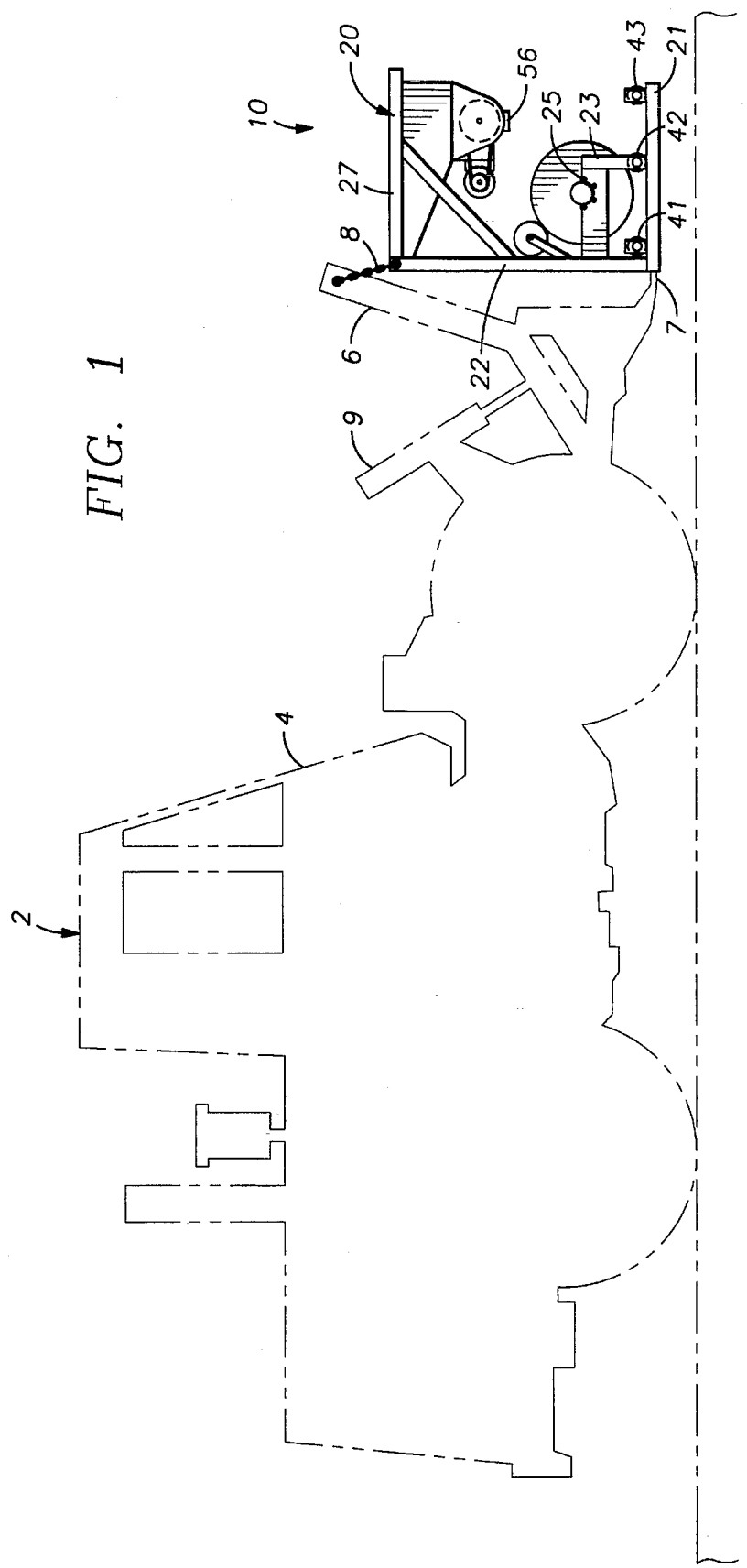
FIG. 1 is a side view of a compactor and an embodiment of the machine of the present invention attached to the blade of the compactor to lay film on the surface or face of a landfill.

Referring to FIG. 1, a compactor 2 is shown with the machine 10 of the present invention. The compactor 2 includes a tractor 4 and a blade 6 which pushes fill into the operating area of the landfill. The compactor 2 is usually powered by a diesel engine and the blade 6, which may be lifted and lowered, is operated from the cab of the tractor 4 by hydraulic fluid lines and a conventional electrical system. The compactor 2 has, therefore, a ready source and supply of hydraulic and electric power. The machine of the present invention 10 is attached to the compactor 2, usually by chains 8 hooking the machine 10 to the blade or trash screen 6. The required hydraulic and electrical power needed to operate the machine 10 is obtained from the compactor 2 by conventional hydraulic and electrical take-off lines.

The machine 10 of the present invention is both simple in design and function. The machine 10 has a frame 20 which includes a back 22 and two sides 24 and 26. The frame may be made from square tubing or any other suitable bracing material. The back 22 has pieces of square tubing not only at the top and bottom and along each side but is reinforced with more pieces, some parallel to the sides and some parallel to the top and bottom. The back 22 supports the rest of the structure of the machine and is made sturdy enough for this task. A preferred embodiment has three additional square tubing pieces equally spaced and parallel to the vertical side tubing pieces, for a total of five vertical pieces and one additional piece equally spaced and parallel to the horizontal top and bottom pieces, for a total of three horizontal pieces. The back 22 of the frame is attached to the blade 6 of the compactor 2. The blade or trash screen 6 of a compactor 2 has a short extended portion 7, for pushing rather than lifting, and abuts the bottom horizontal tubing piece of the back 22 of the frame when the machine 10 is attached to the compactor 2. The chains 8 are secured to the tubing pieces of the back 22 of the frame. A preferred embodiment had only two chains 8, however, three or more chains can be used. The chains may be secured to a single tubing piece of the back 22 or to more than one piece. After securing the machine 10 to the compactor 2 by the chains 8, the machine 10 is lifted off the ground by actuating the hydraulic piston 9 of the compactor 2. The desired position of the machine 10 is as shown in FIG. 1 with the extended port ion 7 abutting the bottom horizontal tubing piece of the back 22 of the frame; however, if the chains 8 were so tight that the machine 10 is raised and sits on the extended portion 7 of the blade 6, this is also a satisfactory position. If the chains are so loose that the machine 10 swings by the chains and the extended portion 7 is above the bottom horizontal tubing piece of the back 22 of the frame, the blade 6 is lowered and the chains tightened.

The ends of the frame 20 perform the function of supporting the roller structure for supporting a roll of polyolefin film and the hopper structure which holds and distributes solids onto the top and inside the edge of the film as the film is unrolled and laid on the open face of the landfill. Each end 24 and 26 has a piece of square tubing 21 extending outward from the back 22. Raised above the tubing 21 is a supporting structure 23 for the roll of polyolefin. Supporting structure 23 of the preferred embodiment is a horizontal plate having a bearing 25 for supporting the roll of polyolefin film and a vertical support brace. This structure of the preferred embodiment is sufficient to support a roll of film having a width of 16 feet. While the tubing 21 and the supporting structure 23 for supporting the roll of film is preferably located at the ends of back 22, this structure may be inside the ends of back 22. The supporting structure 27 for the hoppers includes a horizontally extending piece of tubing and one or more diagonal braces preferably located at the ends of back 22.

Figure 2:
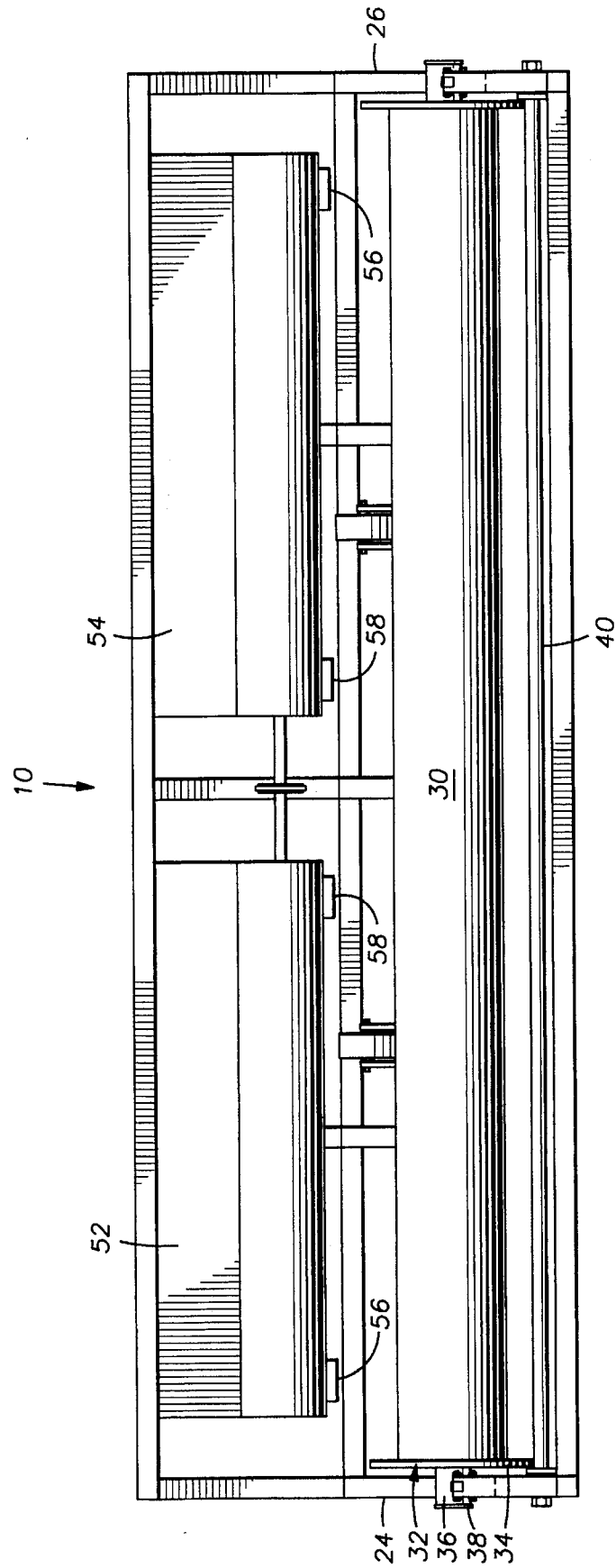
FIG. 2 is a front view of the machine shown in FIG. 1.

Referring now to FIG. 2, the machine 10 is loaded from the front. The polyolefin film is rolled onto a hollow tube and is delivered with widths for the designed machine 10. Smaller widths than 16 feet are possible but the number of passes required to cover a face are then increased. Larger widths are possible however producing the wider widths become more expensive and the weight of the rolls increase such that the structure to support larger widths become more complex. An end cap or top hat structure 32 is forced on to the ends of the hollow tube on which the film is rolled. The cap 32 has a circular plate 34 having a diameter larger than the diameter of a full roll of polyolefin film; a cylinder section 36 which sits in the bearing 25; and an end plate 38 having a slightly larger diameter than the cylinder section 36 which is sufficient to prevent the roll from sliding horizontally out of the bearing 25. Depending on the tolerances, the length of the cylinder section 36 may be sufficiently long so that a circular plate 34 will prevent the roll from coming out of the bearing 25 once in place. The preferred embodiment of the machine 10 does not have any drive on the film roller and the roll of polyolefin film 30 is placed on the bearing 25 using the lifting capacity of the compactor 2. Alternatively, a more complex machine is possible where this roller is driven. A simple modification would be to have one of the end cap or top hat structures 32 extended and have a sprocket attached to the end for a chain drive of this roll.

Below the roll 30 of polyolefin film is a roller 40. The roller 40 is supported on the piece of square tubing 21 extending outward from the back 22. As shown in FIG. 1, there are three brackets 41, 42 and 43 for supporting a roller 40. Preferably, the bracket 41 is used since the film is drawn back and down as the film is unrolled from roll 30. The roller 40 in bracket 41 draws the film as close to the face of the landfill as quickly as possible. The roller 40 may be placed in any bracket 41, 42 or 43 or alternately more than one roller 40 may be used.

Figure 3:
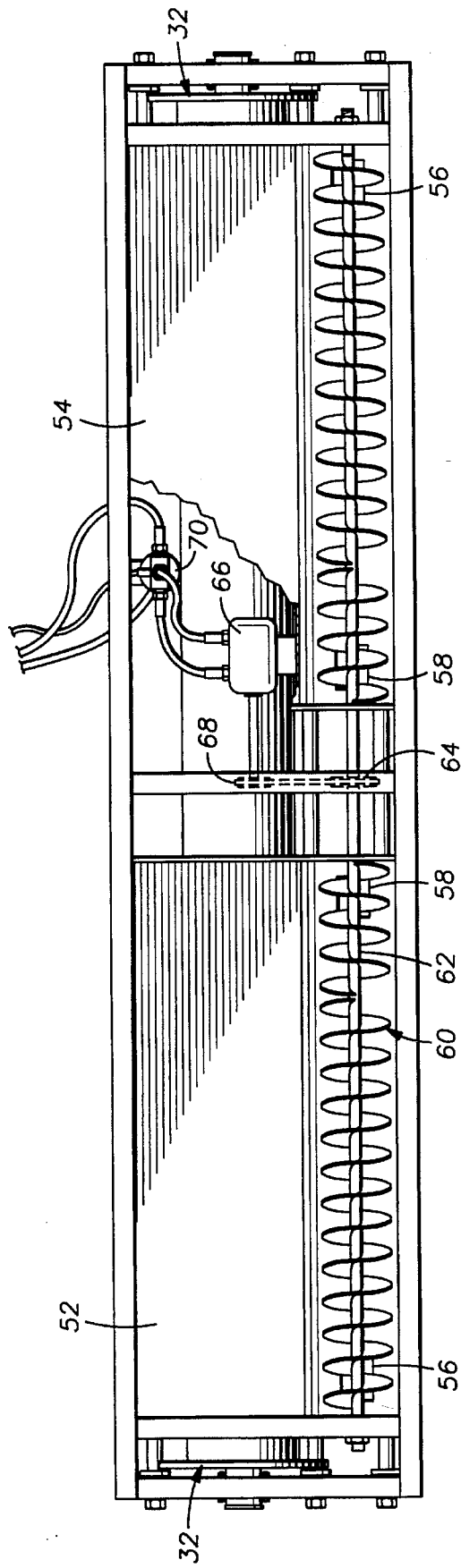
FIG. 3 is a top view of the machine shown in FIG. 1.

Referring now to FIGS. 2 and 3, the back 22 of the frame 20 supports a hopper or distributing structure. The hopper or distributing structure of the preferred embodiment has two hoppers 52 and 54. The hoppers 52 and 54 have a shape such that each has a circular low point (see FIG. 1) and then extend upward in a tapered surface, the tapered surface having more than one slope. At the low point, each hopper 52 and 54 has an outside opening 56. This opening 56 is located above the roll of film 30 and in front of the roll such that the gravity drop of material will be on top of and inside the edges of the film. Each hopper 52 and 54 may also have an inside opening 58. In the portion having the low point of each hopper 52 and 54 is an auger 60. In the preferred embodiment, the auger 60 has a single shaft 62 which extends through both hoppers 52 and 54 and is driven by a sprocket 64 located on the shaft 62 between hoppers 52 and 54. The flights on the auger 60 are bi-directional in each hopper. The greater amount of material is desired to be directed to the outside openings 56. Alternatively, there may be more than the two openings spaced along the low point of each hopper or the location of the openings may be within the portion containing the auger but not at the low point. The auger 60 is driven by a hydraulic motor 66 and a chain 68. The hydraulic motor 66 has an electric valve 70 operated from the cab of the compactor 2 such that the rotation of the auger 60 can be started, stopped and speed changed as well as the rotation reversed.

To operate the machine 10 of the present invention, the hoppers 52 and 54 are filled with an available solid to hold the film as it is unrolled on the face of the landfill. The preferred solid is the soil or earth presently used to cover the face of the landfill. Many landfills require the cover material to be trucked in because there is no available soil which is suitable as a landfill cover material. A much wider variety of solids are possible for use with the machine 10 than are used as cover materials. For example, gumbos which have a high clay content are not usually used as cover material because it is very difficult to spread; however, such materials can be employed in the hoppers 52 and 54 since the auger 60 will create small chunks which work well to hold down the film. Fine sands or gravel are not usually employed as landfill cover since they will permit too much water to infiltrate into the landfill but such materials will work in the machine 10 of the present invention. Other material which can be used in the machine 10 are materials which are normally deposited into the landfill such as non-toxic sludge or waste from a particular manufacturing facility. These materials may be set aside for using as the material to hold the film in place but are not usually present in amounts sufficient or suitable for using as the conventional six inches of cover material.

The machine 10 is secured to the compactor 2 by attaching the back 22 to the blade or trash screen 6 with chains 8. The hydraulic and electrical take-off lines are connected to obtain the power sources from the compactor 2. The blade or trash screen 6 is lifted and checked to make certain that the machine 10 is not swinging but the machine 10 is securely sitting on the blade 6 or the blade 6 abuts the bottom horizontal tubing piece of the back 22 of the frame.

A roll of polyolefin film is placed on a supply or loading table and the top hat structure or end caps 32 are placed on the ends of the core or the hollow tube on which the film is rolled. The compactor 2 with the machine 10 secured thereto is brought to the table and the blade 6 raised to lift the roll 30 of film from the table. A preferred film to be used with the machine 10 of the present invention is a degradable polyolefin film disclosed in U.S. patent application Ser. No. 08/104,195 filed Aug. 10, 1993 entitled "CHEMICALLY DEGRADABLE POLYOLEFIN FILM". The term "degradable" as used herein means that the polyolefin film exhibits more than loss of physical properties such as brittleness or lost of tensile strength but loss of molecular weight. The degradation of the polyolefin films disclosed are clearly characterized as chemical since the degradation does not require UV light (photodegradable) or a bio initiator (biodegradable) for the degradation to be initiated and to take place. The heat generated in a landfill is sufficient to cause the degradation of the film. Thus, while the polyolefin film provides a daily cover, it will degrade and not provide a barrier to the migration of methane or to leachates generated in the landfill over time. The preferred films are produced by conventional melt blowing processes into films of less than 1 to up to 25 mil or greater. The landfill cover films are preferably 2 to 10 mils thick.

Figure 4:
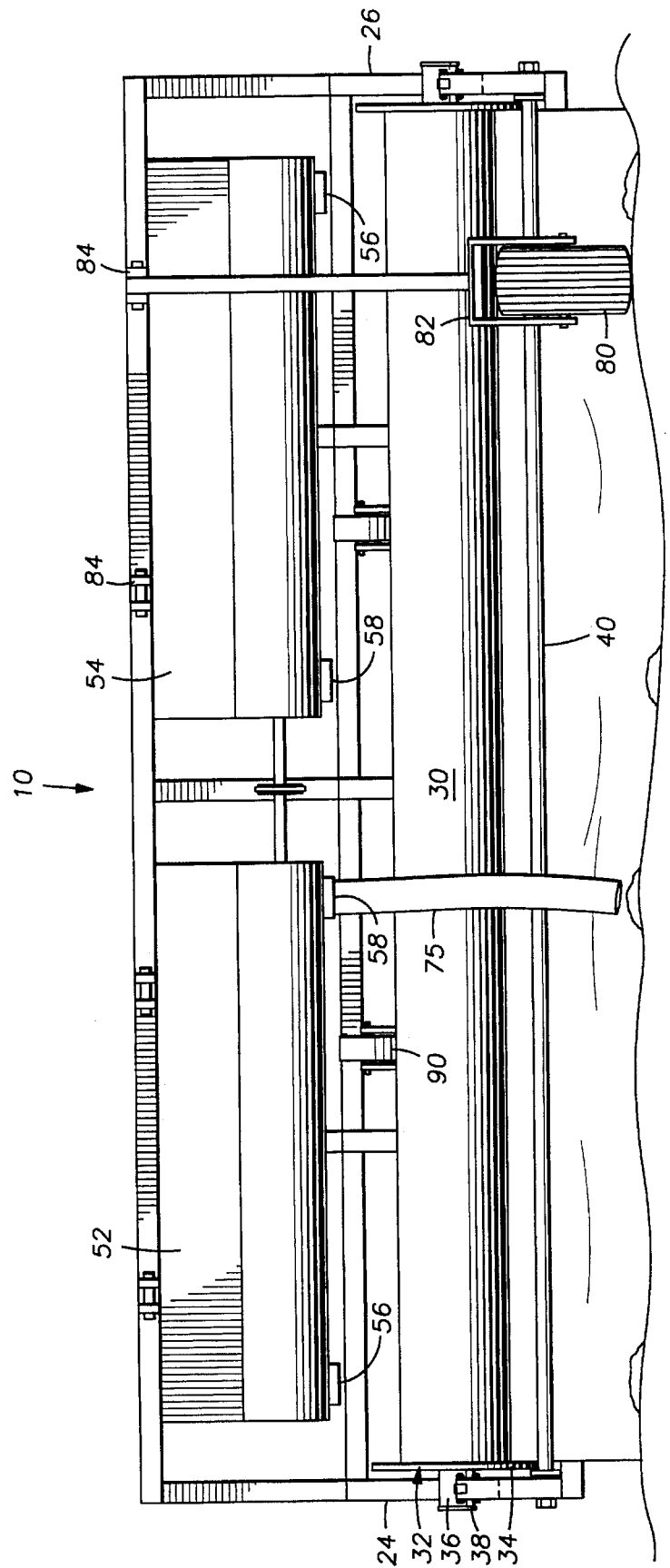
FIG. 4 is a front view of the machine shown in FIG. 1 with the machine in operation.

The compactor 2 is driven to the top of the landfill working face and manually film is pulled off the roll 30 and placed under the roller 40. The end of the film is anchored at the top of the face. Backing the compactor 2 down the working face of the landfill, the film is unrolled from the roll 30 and the auger 60 actuated so that the solid material, preferably soil, is falling by gravity from the openings 56 on top of and inside the edges of the film. Referring to FIG. 4, it is clear that the blade 6 of the compactor 2 is kept as near the face of the landfill as possible and no materials in the landfill will stick upward over the blade 6 without being dragged downward or compacted into the face of the landfill by the blade 6. The film 30 is unrolled on a surface or face of the landfill which is only inches from the machine 10. The solids are dropping from openings 56 and 58 onto the top of the film. Alternatively, a chute 75 may be used. An cut tire inner-tube may be used as chute 75. Another alternative to hold down the film is a tire 80 mounted on a yoke 82 and connected to the upper brace by a bracket 84. A plurality of brackets 84 may be provided and one or more will drag a tire to hold down the film. Still another alternative shown in FIGS. 1, 2 and 4 is a roller 90 which acts as a brake on the roll 30 when the compactor 2 comes to a stop. Since the roll of film 30 is free to turn once the compactor 2 starts down the face, the roller 90 provides enough friction to stop the rotation of the roll of film 30 when the compactor 2 stops. Once reaching the bottom or toe of the face of the landfill, the film 30 is manually cut and anchored. Alternatively, a hydraulic or air powered automatic film cutter may be attached to the back 22 to cut the film 30 at the end of each run. The compactor 2 then is again driven up the face of the landfill for the operation to be repeated. In this pass down the face, the film is overlapped with the film already laid on the face. Conditions of a specific landfill will determine the amount of overlap which will be used but the overlap will be between 6 inches and 36 inches. The procedure is repeated until the whole working face of the landfill is covered by film 30. On the next operating day, trash and garbage is dumped, pushed and compacted over the film laid on the face the previous working day.

One of the significant advantages of the method of the present invention is the saving of landfill space that a 2 to 10 mil film has over the required six inches of soil. Since space is money, it is clear that the more trash and garbage can be compacted into a given area, the greater the saving. A further advantage is that the compactor makes single passes over the face of the landfill in contrast to covering the face with soil where the soil must be pushed onto the face and distributed. It should be understood that the compactor is a pushing and compacting piece of equipment and does not have a bucket which would lift and carry soil. Often this requires two different pieces of equipment to operate the landfill, one to compact and a second to cover.

Another alternative is shown in FIG. 5, which has a powered roller 92 adapted to roll up the film laid on the face of the landfill in a previous day operation so that the film may be reused. This modification of the machine 10 has several alternatives but the preferred embodiment is a separate powered roller 92 mounted close to the back 22 and elevated from the position of roll 30. The roller 92 is powered by a hydraulic motor 94 and electric valve similar to that shown to power the auger 60. In operation, the compactor 2 will operate in the reverse manner to that operation which laid the film, i.e. the compactor with the modified machine 10 having the powered roller 92 secured to the blade 6 will start at the bottom or toe of the face and drive up the face while collecting the film on roller 92. However, the compactor 2 may also be driven down the face, but will be driven down in a forward manner, rather than backed down. Affixed to each bracket 41, 42 and 43 is a roller 40. The film being picked up off the face of the landfill in placed over the rollers 40 in brackets 42 and 43 but under the roller 40 in bracket 41. A piece 98 having a protruding V-shaped nose is between brackets 42 and 43 such that the solid on the film are wedged to the sides to fall off the edges of the film. The film clean of solids is then brought under roller 40 which is in bracket 41 before the film is rolled onto roller 92. Once the length of film is recovered, these lengths are unrolled from roller 92 in the same manner as described hereinabove for laying the film from the roll 30.

We claim:

1. A method of providing a daily cover for a working face of a landfill which comprises:

dumping trash into a landfill during a period of operation, creating an open face of trash;

at the end of a working day, using mechanical means to unroll a first strip of degradable polyolefin film having a top and edges over a portion of said open face;

concurrently depositing mechanically-fed anchoring material onto said top and inside said edges of said first strip of film;

cutting said first strip of film;

unrolling a second strip of degradable polyolefin film adjacent and parallel to said first strip of film, while depositing more of said anchoring material onto said second strip;

cutting said second strip of film;

repeating the above-described steps of unrolling, depositing, and cutting strips of film a plurality of times until said open face is completely covered.

2. A method according to claim 1 wherein said degradable polyolefin film has high elongation characteristics and a strong resistance to tears and punctures.

3. A method according to claim 1 wherein said anchoring material is selected from a group consisting of dirt, clay, gravel, sand, gains, chippings, stones, and sludge, and wherein each piece of said anchoring material has a diameter less than two inches.

4. A method according to claim 1 which further includes the step of placing additional trash onto said strips of film during a further period of operation.

5. A method according to claim 1 which further includes the step of rerolling the film from the face of the landfill at the beginning of a subsequent working day.

* * * * *